United States Patent [19]
Denyer et al.

[11] Patent Number: 5,518,419
[45] Date of Patent: May 21, 1996

[54] SEPARABLE LOW PROFILE CONNECTOR FOR AN AUTOMOTIVE TRANSMISSION

[75] Inventors: Gary J. Denyer, Westland; Kenneth G. Walega, Allen Park, both of Mich.

[73] Assignee: Ford Motor Company, Dearborn, Mich.

[21] Appl. No.: 345,887

[22] Filed: Nov. 28, 1994

[51] Int. Cl.$^6$ .............................. H01R 13/73; H02B 1/01
[52] U.S. Cl. ............................................. 439/559; 439/548
[58] Field of Search .................................. 439/271–276, 439/552, 556, 559, 562, 565, 733, 926, 548

[56] References Cited

U.S. PATENT DOCUMENTS

| | | | |
|---|---|---|---|
| 4,492,421 | 1/1985 | Ito | 339/59 |
| 4,553,807 | 11/1985 | Cane | 339/94 |
| 4,729,743 | 3/1988 | Farrar et al. | 439/276 |
| 4,799,691 | 1/1989 | Stritzke et al. | 277/12 |
| 5,252,088 | 10/1993 | Morello et al. | 439/271 |

FOREIGN PATENT DOCUMENTS 0335721  10/1989  European Pat. Off. ............... 439/272

Primary Examiner—David L. Pirlot
Assistant Examiner—Brian J. Biggi
Attorney, Agent, or Firm—K. G. Mierzwa; R. L. May

[57] ABSTRACT

A sepreable low profile connector for a transmission includes a first elongated receptacle aligned with a central axis. The first receptacle has a flange portion, a first cylindrical portion and a first terminal housing portion. The first cylindrical portion and the first terminal housing portion are sized to be received within the bore, whereas the flange portion is sized larger than the bore. The first cylindrical portion is adjacent the flange and has a diameter smaller than the bore. The first receptacle has longitudinal openings extending through the flange portion, the first cylindrical portion and the first terminal housing portion. Electrically conductive terminals are located within the longitudinal openings in the first terminal housing portion and are juxtaposed to the inner wall of the bore. At least one seal is located on the cylindrical portion adjacent the bore. A second receptacle has a second cylindrical portion, and a second terminal portion. The second cylindrical portion has a diameter smaller than the bore. The second terminal portion has a recess for receiving the first terminal portion. At least one seal is located on the second cylindrical portion adjacent the bore. A second electrical terminal is connected to the second terminal portion electrically connecting with the first terminal.

11 Claims, 2 Drawing Sheets

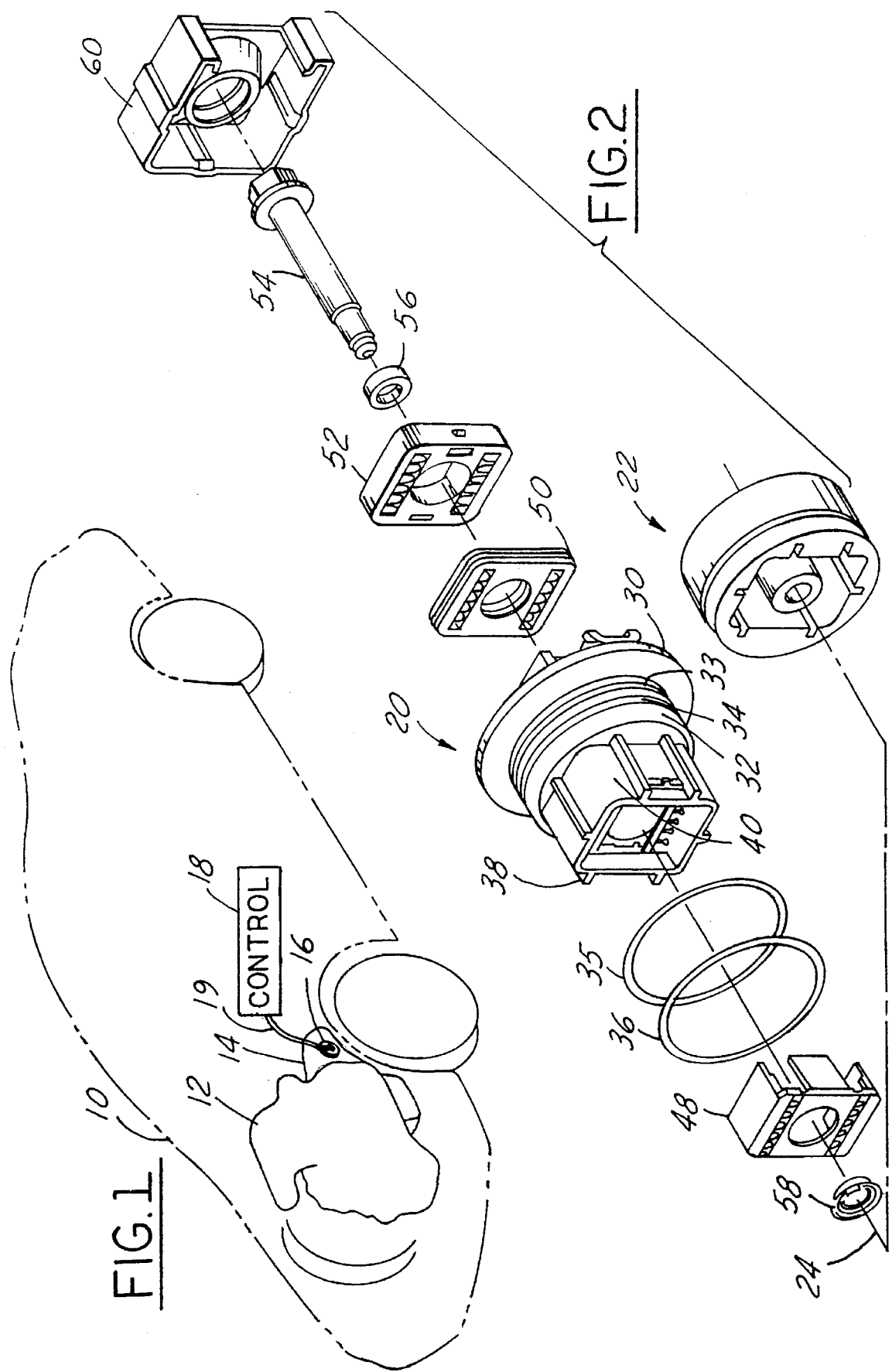

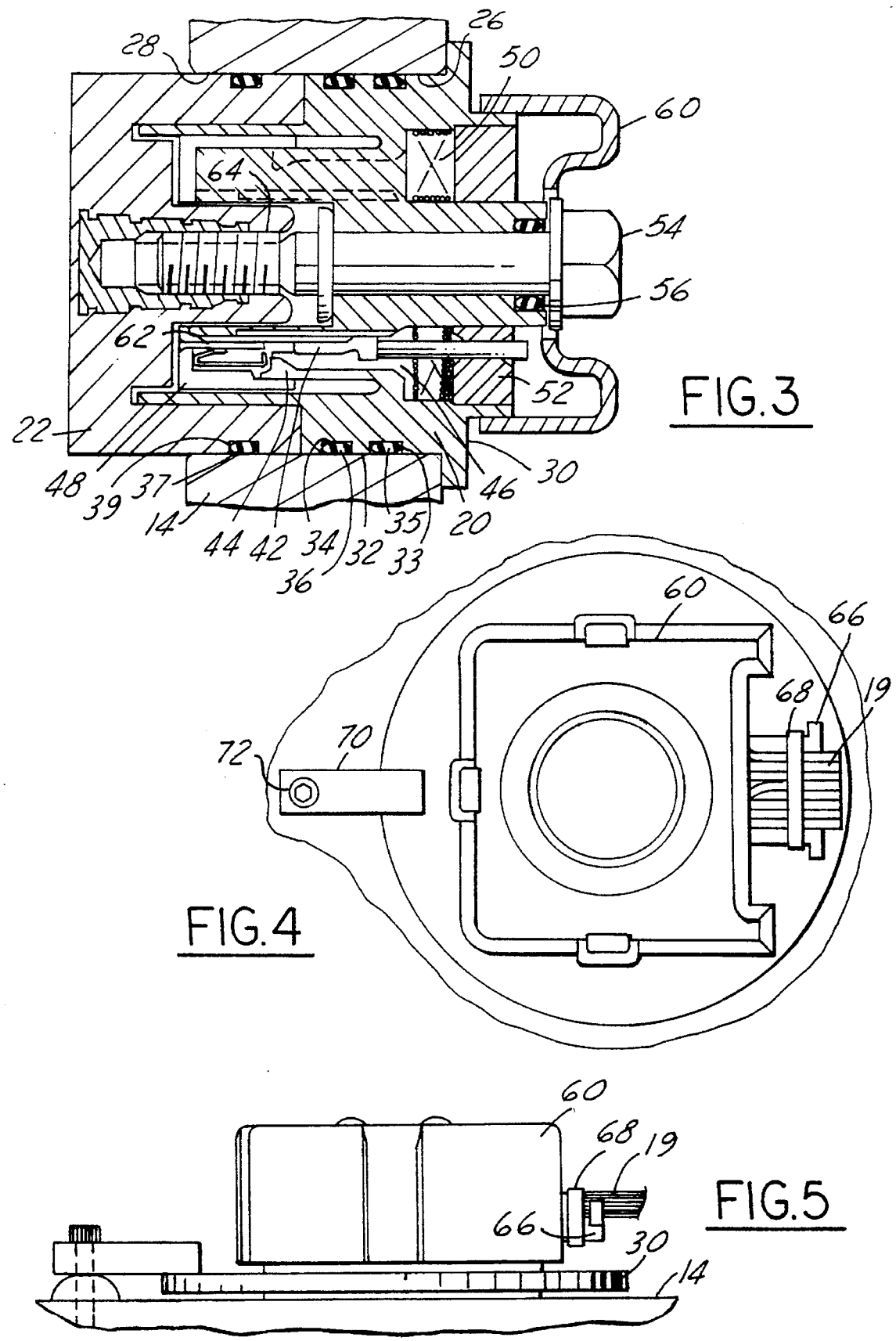

SEPARABLE LOW PROFILE CONNECTOR FOR AN AUTOMOTIVE TRANSMISSION

BACKGROUND OF THE INVENTION

The present invention relates to a separable connector and more specifically to a separable connector for a transmission in an automotive vehicle.

In automotive transmissions, wires for controlling electrical components within the transmission are linked to a control unit outside the transmission through an opening in the transmission. Any holes in the transmission must be splash resistant from the outside to prevent water and other contaminants from entering into the transmission housing. In addition, any holes must prevent transmission fluid from leaking outside the transmission.

One method for connecting a control module to electrical components within the transmission housing is by using a pass through connector. In such a design, a wire runs continuously from the electrical component to the control unit through the transmission housing using a pass through connector. Such a design is undesirable since serviceablity becomes inconvenient because the wires remain connected when servicing the transmission.

A disadvantage of prior transmission connector designs is that the connectors protrude a relatively large distance from the surface of the transmission housing. Because clearances are becoming ever smaller in automotive designs, having reduced extension from the transmission is desirable.

Due to increasing packing requirements, it would therefore be desirable to provide a separable connector which protrudes minimally through the transmission housing as well as having the highly desirable qualities of splash and leak resistance and serviceability.

SUMMARY OF THE INVENTION

One object of the present invention is to advantageously reduce the package height of a transmission connector by placing its contacts within the bore of the transmission housing.

The present invention includes a first elongated receptacle aligned with a central axis. The first receptacle has a flange portion, a first cylindrical portion and a first terminal housing portion. The first cylindrical portion and the first terminal housing portion are sized to be received within the bore, whereas the flange portion is sized larger than the bore. The first cylindrical portion is adjacent the flange and has a diameter smaller than the bore. The first receptacle has longitudinal openings extending through the flange portion, the first cylindrical portion and the first terminal housing portion. Electrically conductive terminals are located within the longitudinal openings in the first terminal housing portion and are juxtaposed to the inner wall of the bore. At least one seal is located on the cylindrical portion adjacent the bore.

A second receptacle has a second cylindrical portion, and a second terminal portion. The second cylindrical portion has a diameter smaller than the bore. The second terminal portion has a recess for receiving the first terminal portion. At least one seal is located on the second cylindrical portion adjacent the bore. A second electrical terminal is connected to the second terminal portion electrically connecting with the first terminal.

BRIEF DESCRIPTION OF THE DRAWINGS

FIG. 1 is a perspective of an automobile having a having a transmission with a connector according to the present invention.

FIG. 2 is a exploded view of the outer portion of the connector.

FIG. 3 is a cross sectional view of the connector.

FIG. 4 is a side view of the top portion of the connector.

FIG. 5 is a top view of the connector.

DETAILED DESCRIPTION OF THE PREFERRED EMBODIMENT

Referring to FIG. 1, an automotive vehicle 10 has an engine 12 connected to a transmission 14. Transmission 14 has a connector 16 which connects a control module 18 to electrical components within transmission 14, such as solenoids, through wires 19.

Referring now to FIGS. 2 and 3, connector 16 is comprised of two interconnectable housings formed of an electrically nonconductive material such as a heat resistant plastic. The first housing is the outer receptacle 20 which is exposed to the exterior of transmission 14. The second housing is inner receptacle 22 which is a separate piece or may be integral to an electrical component such as a solenoid body inside transmission 14. Serviceability is improved from a pass through design since the two housings can be separated during servicing. Inner receptacle 22 may be connected directly to diagnostic equipment for troubleshooting.

Connector 16 seals a bore 26 in the housing of transmission 14 as well as provides electrical connection through bore 26. Bore 26 is preferably machined to have a smooth finish on inner wall 28 to improve leak resistance. Connector 16 has a longitudinal axis 24 through its center which aligned with the central axis of bore 26 in transmission 14.

Outer receptacle 20 is shaped to fit partially within bore 26. Flange 30, having a diameter greater than bore 26, prevents the insertion of outer receptacle 20 completely through bore 26. A cylindrical portion 32 sized just smaller than bore 26 has two grooves 33 and 34 which house two O-rings 35 and 36. As shown, cylindrical portion 32 has two O-rings, however, the number of O-rings can vary depending on the particular application.

A terminal housing portion 40 formed of walls extending longitudinally from cylindrical portion 32 contains electrically conductive terminals 42. As can best be seen in FIG. 3, a tab 44 holds terminal 42 from backing out of longitudinally extending hole 46 in outer receptacle 20. A spacer 48 fitted onto terminal housing portion 40 urges tab 44 to hold terminal 42 in place.

Terminal housing portion 40 has keys 38 which are used to guide inner receptacle 22 into outer receptacle 20 in a unique manner to prevent misalignment of the electrical connection through terminals 42.

After terminals 42 are inserted into housing portion 40, a grommet 50 is placed inside outer receptacle 20 to provide a seal to prevent leakage into longitudinally extending holes 46. A cover 52 holds grommet 50 securely in place by a bolt 54. A bolt grommet 56 is placed over bolt 54 to prevent leakage around bolt 54. Bolt 54 extends though outer receptacle 20 and push nut 58 to keep bolt 54 secured to outer receptacle 20 during installation.

A cap 60 is placed over the outside of outer receptacle 20. Cap 60 provides initial leak protection by preventing a high force splash from reaching the point where terminals 42 extend through cover 52. Cap 60 has a low profile extending only about 17 mm from the surface of transmission 14.

Inner receptacle 22 is sized to fit within bore 26 and is sealed against inner wall 28 by O-ring 37 which is in a groove 39. Inner receptacle 22 is shaped to receive an electrical terminal 62 which is the mate to electrical terminal 42 within bore 26 of transmission 14. Providing the electrical connection within bore 26 of transmission 14 reduces length of connector 16 outside transmission 14. Electrical terminal 62 is preferable a male terminal, whereas electrical terminal 42 is preferably the female terminal. Electrical terminal 42 is electrically connected to electrical components within transmission 14.

Inner receptacle 22 also has an opening 64 receiving bolt 54. Upon tightening bolt 54 into opening 64, outer receptacle 20 is urged toward inner receptacle 22.

Referring now to FIGS. 4 and 5, as an alternative to bolt 54, a bracket 70 may be provided to hold inner receptacle 22 and outer receptacle 20 together. Bracket 70 extends to flange 30 and is secured to transmission 14 by fastener 72.

A strain relief 30 extending from flange 30 secures wires 19 using a tie wrap 68 or other securing means. Strain relief 30 prevents terminals 42 from becoming separated from their associated terminals 62 thus improving reliability of connector 16.

Various modifications will be apparent to those skilled in the art. For instance, such modifications include providing a flange on the inner receptacle or providing different numbers of seals on either the inner or outer receptacles. All such modifications would be within the scope of this invention.

What is claimed is:

1. A separable connector for an automotive transmission having a bore with a diameter having a central axis and bounded by an inner wall, said connector comprising:

a first elongated receptacle aligned with said central axis, said first receptacle having a flange portion, a first cylindrical portion and a first terminal housing portion, said first cylindrical portion and said first terminal housing portion sized to be received within said bore;

said flange portion sized larger than said bore;

said first cylindrical portion adjacent said flange having a diameter smaller than said bore;

said first receptacle having longitudinal openings extending through said flange portion, said first cylindrical portion and said first terminal housing portion;

electrically conductive terminals located within said longitudinal openings in said first terminal housing portion, said terminals juxtaposed to said inner wall of said bore;

at least one seal located on said cylindrical portion adjacent said bore;

a second receptacle having a second cylindrical portion, and a second terminal portion;

said second cylindrical portion having a diameter smaller than said bore;

said second terminal portion having a recess for receiving said first terminal portion;

at least one seal located on said second cylindrical portion adjacent said bore; and a second electrical terminal connected to said second terminal portion electrically connecting with the first terminal.

2. A separable connector as recited in claim 1 wherein said terminal portion comprises a longitudinally extending wall, said wall shaped to fit within said recess.

3. A separable connector as recited in claim 2 wherein said wall includes a key extending therefrom and said recess is shaped to receive said key so that said first receptacle connects with said second receptacle in a particular direction.

4. A separable connector as recited in claim 1 wherein said first receptacle has a first hole extending therethrough along said longitudinal axis and said second receptacle has a second hole, said connector further comprising a threaded fastener received within said first and second holes for fastening said first receptacle to said second receptacle.

5. A separable connector as recited in claim 1 further comprising a cap portion covering said longitudinally extending holes in said flange.

6. A separable connector as recited in claim 1 further comprising a bracket, said bracket mounted to said transmission and said first receptacle.

7. A separable connector as recited in claim 1 further comprising wires extending from said terminal through said longitudinally extending holes, wherein said flange has an extension and said wires are securely attached to said extension.

8. A separable connector as recited in claim 1 further comprising a seal sealing the longitudinally extending openings.

9. A separable connector as recited in claim 8 further comprising a cover covering said seal.

10. A separable connector as recited in claim 1 further comprising a spacer received within said terminal portion and securing said terminals within said terminal portion.

11. A separable connector as recited in claim 1 wherein said first cylindrical portion has two seals comprising O-rings.

\* \* \* \* \*